United States Patent
Feix et al.

(10) Patent No.: US 9,772,821 B2
(45) Date of Patent: Sep. 26, 2017

(54) CRYPTOGRAPHY METHOD COMPRISING AN OPERATION OF MULTIPLICATION BY A SCALAR OR AN EXPONENTIATION

(71) Applicant: INSIDE SECURE, Meyreuil (FR)

(72) Inventors: Benoît Feix, Aubagne (FR); Vincent Verneuil, Aix en Provence (FR); Christophe Clavier, Rilhac Lastours (FR)

(73) Assignee: Inside Secure, Meyreuil (FR)

( * ) Notice: Subject to any disclaimer, the term of this patent is extended or adjusted under 35 U.S.C. 154(b) by 118 days.

(21) Appl. No.: 14/762,010

(22) PCT Filed: Jan. 13, 2014

(86) PCT No.: PCT/FR2014/050054
§ 371 (c)(1),
(2) Date: Jul. 20, 2015

(87) PCT Pub. No.: WO2014/111647
PCT Pub. Date: Jul. 24, 2014

(65) Prior Publication Data
US 2015/0339102 A1  Nov. 26, 2015

(30) Foreign Application Priority Data
Jan. 18, 2013  (FR) ..................... 13 50431

(51) Int. Cl.
*G06F 7/72* (2006.01)
*H04L 9/30* (2006.01)
*H04L 9/32* (2006.01)

(52) U.S. Cl.
CPC ............ *G06F 7/725* (2013.01); *H04L 9/3066* (2013.01); *H04L 9/3236* (2013.01); *G06F 2207/7252* (2013.01)

(58) Field of Classification Search
CPC ............ G06F 7/726; G06F 2207/7252; H04L 9/3066; H04L 9/3236
See application file for complete search history.

(56) References Cited

U.S. PATENT DOCUMENTS 6,088,798 A * 7/2000 Shimbo ................. H04L 9/3066
380/30
6,141,420 A * 10/2000 Vanstone ................ G06F 7/725
380/28

(Continued)

OTHER PUBLICATIONS

Jul. 21, 2015 International Preliminary Report on Patentability issued in International Patent Application No. PCT/FR2014/050054.

(Continued)

*Primary Examiner* — Ellen Tran
(74) *Attorney, Agent, or Firm* — Brake Hughes Bellermann LLP

(57) ABSTRACT

A cryptographic data processing method, implemented in an electronic device including a processor, the method including steps of providing a point of an elliptic curve in a Galois field, and a whole number, and of calculating a scalar product of the point by the number, the coordinates of the point and the number having a size greater than the size of words that may be processed directly by the processor, the scalar multiplication of the point by the number including steps of: storing scalar multiples of the point multiplied-by the number 2 raised to a power belonging to a series of whole numbers, setting a resulting point for each non-zero bit of the first number, adding the resulting point and one of the stored multiple points, and providing at the output of the processor the resulting point as result of the scalar product.

17 Claims, 1 Drawing Sheet

(56) References Cited

U.S. PATENT DOCUMENTS 7,916,860 B2* 3/2011 Vasyltsov ............... G06F 7/724
380/286
2009/0214023 A1 8/2009 Al-Somani et al.

OTHER PUBLICATIONS

Trichina et al., "Implementation of Elliptic Curve Cryptography with Built-In Counter Measures Against Side Channel Attacks," Cryptographic Hardware and Embedded Systems 2002, 2003, pp. 98-113.

Tunstall, "Random Order m-ary Exponentiation," ACISP, 2009, pp. 437-451.

Hankerson et al., "Elliptic Curve Arithmetic," Guide to Elliptic Curve Cryptography, Springer Verlag, Berlin, Germany, Jan. 1, 2004, pp. 75-113.

Apr. 25, 2014 International Search Report issued in International Application No. PCT/FR2014/050054.

Apr. 25, 2014 Written Opinion issued in International Application No. PCT/FR2014/050054.

* cited by examiner

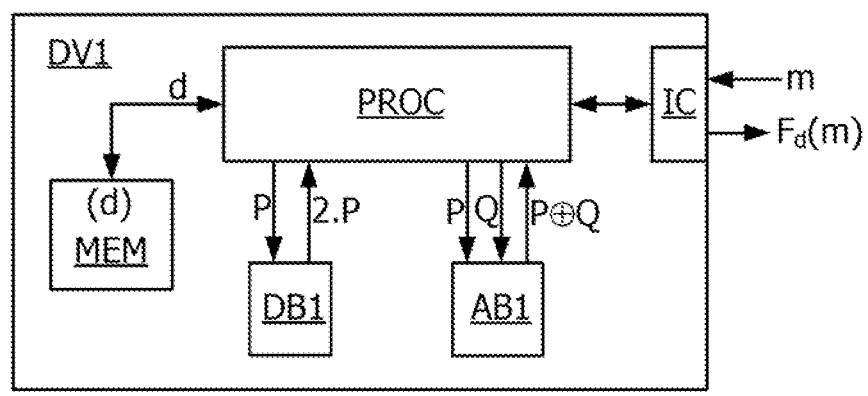

CRYPTOGRAPHY METHOD COMPRISING AN OPERATION OF MULTIPLICATION BY A SCALAR OR AN EXPONENTIATION

The present invention relates to the implementation of elliptic curve cryptography in an electronic device, and more particularly a method for calculating the result of the multiplication by a scalar of a point belonging to an elliptic curve.

Various known elliptic curve cryptography methods are based on scalar multiplication, the mathematical expression of which is: $[k] \cdot P = P [+] P [+] \ldots [+] P$ (k times), P being a point chosen on an elliptic curve, k being a whole number, and "[+]" being the adding operator applied to points of the elliptic curve. The number k is for example a private key, and the result point $[k] \cdot P$ of this operation, or one of the affine coordinates of the result point, can be used as public key. Indeed, with knowledge of the result $[k] \cdot P$ and the coordinates of the point P, it can be extremely difficult to find the value of the number k. This operation is used for example during a signature calculation, or to generate a cryptography key, or even to cipher a message. This operation is implemented by various cryptography algorithms based on elliptic curves, such as the ECDSA ("Elliptic Curve Digital Signature Algorithm"), ECDH (Elliptic Curve Diffie-Hellman), ECIES (Elliptic Curve Integrated Cryptography Scheme), etc.

The operations between points of an elliptic curve amount to operations on the coordinates of these points in Galois fields of the form $F_q$, q being either a prime number p, or a power of 2 (of the form $2^m$). The scalar multiplication operation is generally broken down into a series of operations of adding and doubling points. Thus, one well-known method involves executing a scalar multiplication calculation by means of the "double & add" algorithm A1 or A1' appearing in Appendix I. The algorithm A1 is said to be "from left to right" as the first steps of the calculation loop start by processing the most significant bits of the scalar number k, through to the least significant bits. The algorithm A1' is said to be "from right to left" as the first steps of the calculation loop start by processing the least significant bits of the scalar number, through to the most significant bits.

These algorithms comprise for each iteration, i.e. each bit of the exponent, an addition of two identical points R of an elliptic curve, and if the bit of the scalar processed by the iteration is equal to 1, an addition of the point R with another point P of the elliptic curve. Different functions are generally used to execute each of these operations, the addition of two identical points being executed by means of a doubling function or "DOUBLE" function, whereas the addition of two different points is executed by means of an adding function or "ADD" function. This distinction is due to the fact that it is possible to calculate P [+] Q more rapidly when the points P and Q are identical than in the opposite case, by means of the DOUBLE function. In certain coordinate systems, the addition of two identical points can result in a division by zero. Another calculation mode is thus necessary.

In a smart-card-type electronic device, cryptographic calculation is generally executed by a specific processor, such as an arithmetic coprocessor or a crypto-processor. The calculation of "$[k] \cdot P$", and more particularly the execution of additions of points of an elliptic curve, occupies the majority of the computing time of the processor relative to the total time it takes to generate a key, calculate a signature, check the signature, or perform a ciphering or deciphering operation. Using the DOUBLE function or the ADD function alternately depending on the type of calculation to be performed thus optimizes the total ciphering, deciphering, signature or signature check computing time.

However, using two different DOUBLE and ADD functions leads to an information leak detectable by Simple Power Analysis (SPA), i.e. by analyzing the current consumption of the card. As the DOUBLE function has an execution time shorter than the ADD function, it is possible to differentiate these two operations by observing the current consumption curve of the component. "Current consumption" means any observable physical value that reveals the operation of the electronic component executing the operation, in particular the electric current consumed or the electromagnetic radiation of the component. Thus, on a curve of current consumption of a component executing the algorithm A1, it is possible to distinguish the consumption profile of the DOUBLE function and that of the ADD function. A DOUBLE operation followed by an ADD operation (step 2.1 followed by a step 2.2) reveals that the bit of the scalar number k is equal to 1 since the conditional branching towards step 2.2 requires that the condition $k_s=1$ be met. Conversely, a DOUBLE operation followed by another DOUBLE operation (step 2.1 followed by another step 2.1) reveals that the bit $k_s$ of the scalar number is equal to 0. The bits of the scalar number k can thus be discovered one after the other by a simple observation of the current consumption curve.

To overcome this drawback, steps 2.1 and 2.2 of the algorithms A1 and A1' could, if possible, be performed by means of the ADD function only, without using the DOUBLE function. However, a more detailed analysis of the current consumption enables step 2.1 to be distinguished from step 2.2 as the algorithm A1 or A1' is not regular. Indeed, in this case, the time elapsing between two successive additions is not the same when the two additions correspond to the successive execution of two steps 2.1 (bit $k_s$ equal to 0) or correspond to the execution of a step 2.1 followed by a step 2.2 (bit $k_s$ equal to 1). An attacker could thus "zoom" on the portion of the consumption curve extending between the additions and would see a temporal dissymmetry revealing the conditional branching and thus the value of the bit of the scalar number.

The algorithm A2 appearing in Appendix I, called "Montgomery Ladder", also enables a scalar multiplication calculation to be performed. Upon each iteration, this algorithm involves performing two additions, one applied to two different points, and the other applied to two identical points and thus capable of being performed by an adding or a doubling operation. Upon each iteration, one of the two registers $R_0$, $R_1$ receives the sum of the content of the two registers, and the other of the two registers receives double the content of this register. If the bit $k_s$ corresponding to the iteration in progress of the scalar number k is on 0, the register $R_1$ receives the result of the addition, and the content of the register $R_0$ is doubled, and conversely if the bit $k_s$ is on 1.

This algorithm offers the advantage of being perfectly regular in that each iteration systematically comprises two additions, or one addition and a doubling operation. This advantage is obtained without having to add any dummy operation, thus without having to increase the computing time.

It is also possible to reduce the computing time of a product by a scalar number by an appropriate selection of a representation of points of an elliptic curve. Indeed, the doubling and adding operations in affine coordinates comprise an inversion calculation which requires a computing time corresponding to that of several tens of multiplications. One well-known method involves removing this inversion calculation by using a representation in projective coordinates, such as homogeneous or Jacobian projective coordinates. The representation in homogeneous projective coordinates consists in transforming the affine coordinates (x, y) into coordinates of the form (X/Z,Y/Z), Z being different from 0. The equation of the Weierstrass elliptic curve then becomes: $Y^2Z=X^3+aXZ^2+bZ^3$. The representation in Jacobian projective coordinates consists in transforming the affine coordinates (x, y) into coordinates of the form $(X/Z^2, Y/Z^3)$, Z being different from 0. The equation of the Weierstrass elliptic curve becomes: $Y^2=X^3+aXZ^4+bZ^6$.

It could thus be desirable to further reduce the computing time of a method for executing a scalar multiplication calculation applied to a point of an elliptic curve. It could also be desirable to protect such a method from the abovementioned hidden channel attacks, while avoiding adversely affecting the computing time.

Some embodiments relate to a cryptographic data processing method, implemented in an electronic device comprising a processor, the method comprising steps of providing a point of an elliptic curve in a Galois field, and a first whole number, and of calculating a scalar multiplication of the point by the first number, the coordinates of the point and the first number having a size greater than the size of words that may be processed directly by the processor. According to one embodiment, the scalar multiplication calculation of the point by the first number comprises steps of: storing a series of multiple points each resulting from the scalar product of the point by 2 raised to a power belonging to a series of whole numbers, setting a resulting point belonging to the elliptic curve, executing several iterations to take into account each of the bits of the first number only once, each iteration comprising a calculation of a combination of several bits of the first number, and if the combination is non-zero, an adding calculation between the resulting point and one of the stored multiple points corresponding to ranks of the bits of the combination of bits of the first number, and providing at the output of the processor the resulting point as result of the scalar multiplication calculation of the point by the first number.

According to one embodiment, the bits of the first number are taken into account in a random or pseudo-random order when calculating the resulting point.

According to one embodiment, the adding calculations between the resulting point and the stored multiples are performed in affine coordinates.

According to one embodiment, the adding calculations between the resulting point and the stored results are performed in projective coordinates.

According to one embodiment, the scalar multiples of the point are stored in affine coordinates, and the results obtained are transformed into projective coordinates by adding to the affine coordinates a third coordinate having a value set to 1.

According to one embodiment, the first number and the coordinates of the point are NAF coded, the method comprising for each bit equal to −1 or combination of bits lower than or equal to −1, of the first number, an adding calculation between the resulting point and the opposite of the stored multiple corresponding to the rank of the bit equal to −1 or of the combination of bits lower than or equal to −1, of the first number.

According to one embodiment, the method comprises a stage of generating a pair of private and public keys, comprising steps of: randomly choosing a second number as private key, choosing as base point a point of an elliptic curve, the stored multiples having been calculated from the base point, and calculating the resulting point of the scalar multiplication of the base point by the second number using the multiple points stored, the resulting point or one of its coordinates being chosen as public key corresponding to the private key.

According to one embodiment, the method comprises a stage for signing a message, comprising steps of: randomly choosing a second number, choosing as base point a point of an elliptic curve, the stored multiples having been calculated from the base point, and calculating the resulting point, coming from the scalar multiplication of the base point by the second number using the stored multiples, applying a hashing function to the message to be signed, and calculating the signature of the message by the following equations:

$x=i \mod n$ $y=k^{-1}(H(m)+sx) \mod n$, in which x and y represent the signature of the message m, i being a coordinate of the resulting point, k being the second number, H(m) the hashing function applied to the message m, s a number used as private key, and n being the smallest positive whole number such that the scalar product of n by the base point is equal to the point at infinity of the elliptic curve.

Some embodiments also relate to an electronic device comprising a processor, configured to implement the method previously defined.

According to one embodiment, the device is portable and autonomous, or of smart card type.

Examples of embodiments of the present invention and of implementation of the method of the present invention will be described below, in relation with, but not limited to, the single enclosed FIGURE schematically representing an electronic device implementing a scalar multiplication algorithm according to one embodiment.

The present invention relates to a cryptographic calculation method comprising additions of identical or different points, belonging to an elliptic curve in a Galois field. This method is implemented by an electronic device configured to execute cryptographic calculations, including scalar multiplications of a point by a whole number. The method may comprise a scalar multiplication calculation used by the ECDSA, ECDH, ECIES, etc. algorithms.

According to one embodiment, this method is based on a derivation of the algorithm A1', in which the doubling calculations are performed once, given that the point P is not required to be changed often. Indeed, the point P being the subject of such calculations is in some cases set for example as base point being part of the so-called "domain" parameters of an elliptic curve cryptographic system. These domain parameters particularly comprise the coefficients a and b of a so-called Weierstrass elliptic curve of the form $y^2=x^3+ax+b$ in a field $F_p$, p being a prime number strictly greater than 3, with $4a^3+27b^2 \neq 0$, or of the form $y^2+xy=x^3+ax^{2e}+b$ in a binary field $F2^m$. The calculations of doubling points of an elliptic curve can be performed by using an optimized addition taking into account the equality of the operands.

The algorithm A3 in Appendix II is an example of scalar multiplication algorithm, from right to left, according to one embodiment. The algorithm A3 uses a table or a set of v registers DP of the size of the point P (i.e. of the size of the coordinates of this point), v being the number of bits of the scalar number k. This algorithm uses another register R also of the size of the point P. It shall be noted that the size of the register may vary according to the coordinate system chosen.

In step 1 of this algorithm, the register R is set to the value of the neutral point "Ø" (such that P [+] Ø=Ø [+] P=P) and the register DP[0] receives the value of the point P. Step 2 is a loop control on the number v of bits of the scalar number k. In step 2.1 in the loop, the doubling function is called to load into the register DP[i+1] the value of double the point contained in the register DP[i]. Step 2.2 in the loop is executed if the current bit $k_i$ of rank i of the scalar number k is on 1. If this is the case, the adding function is called to increment the content of the register R by the value contained in the register DP[i]. Following v iterations, the register R contains the result [k]·P of the scalar multiplication operation of the point P by the whole number k. Each register DP[i] of the set of registers DP stores a multiple in $2^i$·P (for each value of i between 0 and v−1) of the point P. In this way, if a new scalar multiplication calculation must be performed with a scalar number k' different from the number k, it is not necessary to recalculate the multiples $2^i$·P of the point P.

Thus, the algorithm A4 in Appendix II obtains the result [k]·P of the multiplication of the scalar number k by the point P only by executing step 2.2 upon each iteration.

In a Weierstrass elliptic curve (on a Galois field $F_p$), the opposite of a point P of coordinates (x, y) is the point [−]P of coordinates (x, −y). The sum of two points P1(x1,y1) and P2(x2,y2) (with P2≠±P1), is a point P3(x3,y3) such that:

$$x3 = m^2 - x1 - x2$$

$$y3 = m(x1-x3) - y1, \text{ with } m=(y2-y1)/(x2-x1). \quad (1)$$

The double of a point P(x,y) with y≠0 is a point P4(x4, y4)=[2]·P such that:

$$x4 = m^2 - 2x$$

$$y4 = m(x-x4) - y, \text{ with } m=(3x^2+a)/2y. \quad (2)$$

It can be seen that the calculation of the number m in the adding and doubling operations requires an inversion calculation. Such an inversion calculation proves very complex and costly in computing time. It is possible to remove the inversion calculation by appropriately selecting a representation of the points of an elliptic curve. For this purpose, one well-known method involves using a representation in projective coordinates, such as the representation in homogeneous or Jacobian projective coordinates. The representation in homogeneous projective coordinates consists in replacing the affine coordinates (x, y) with the coordinates (X/Z,Y/Z), Z being different from 0. Conversely, it is possible to come back to affine coordinates of a point by replacing the projective coordinates with the coordinates (X=x·Z,Y=y·Z, Z), Z possibly being chosen equal to 1 or any other non-zero value of the field $F_p$. The change from affine coordinates to projective coordinates can be carried out merely by choosing Z equal to 1.

The sum of two points P1(X1,Y1,Z1) and P2(X2,Y2,Z2) in homogeneous projective coordinates, with P2≠[±]P1, Z1≠0 and Z2≠0, is a point P3(X3,Y3,Z3) such that:

$$\begin{vmatrix} X3 = B \cdot C \\ Y3 = A \cdot (B^2 \cdot X1 \cdot Z2 - C) - B^3 \cdot Y1 \cdot Z2 \\ Z3 = B^3 \cdot Z1 \cdot Z2 \end{vmatrix} \text{ with:} \quad (3)$$

-continued $$\begin{vmatrix} A = Y2 \cdot Z1 - Y1 \cdot Z2 \\ B = X2 \cdot Z1 - X1 \cdot Z2 \\ C = A^2 \cdot Z1 \cdot Z2 - B^3 - 2 \cdot B^2 \cdot X1 \cdot Z2 \end{vmatrix}$$

The doubling of a point P(X,Y,Z) is a point P4(X4,Y4,Z4) such that:

$$\begin{vmatrix} X4 = B \cdot E \\ Y4 = A \cdot (D - E) - 2 \cdot C^2 \\ Z4 = B^3 \end{vmatrix} \text{ with: } \begin{vmatrix} A = 3 \cdot X^2 + a \cdot Z^2 \\ B = 2 \cdot Y \cdot Z \\ C = B \cdot Y \\ D = 2 \cdot C \cdot X \\ E = A^2 - 2 \cdot D \end{vmatrix} \quad (4)$$

The operations above are performed in the Galois field $F_p$, modulo p. It can be seen that the equations above do not include any inversion operations. Thus, an adding operation in homogeneous projective coordinates requires twelve multiplications, two squaring operations and seven additions, these operations being modular and exclusively involving big numbers. The doubling operation in homogeneous projective coordinates requires seven multiplications, five squaring operations and eleven additions. Furthermore, if a is chosen equal to −3 (as is the case in all the curves of the FIPS 186-3 standard), the number A can be factorized in the addition formula in the following manner:

$$A = 3 \cdot (X1 + Z1^2) \cdot (X1 - Z1^2) \quad (5)$$

which saves on two squaring operations of big whole numbers.

According to one embodiment, the values stored in the registers DP are calculated and stored in affine coordinates and transformed into Jacobian or homogeneous projective coordinates by choosing Z equal to 1 upon the scalar multiplication. Indeed, if the values stored in the registers DP are used for several calculations of product by a scalar number, an acceptable compromise can involve calculating these values by calculations in affine coordinates, more costly in computing time, or by calculations in projective coordinates followed by conversions of the points into affine coordinates. The result is that the addition of a point P1(X1,Y1,Z1) with a multiple DP[i] of coordinates (DX, DY,1), performed in step 2.2 can be simplified in the following manner:

$$\begin{vmatrix} X3 = B \cdot C \\ Y3 = A \cdot (B^2 \cdot X1 - C) - B^3 \cdot Y1 \\ Z3 = B^3 \cdot Z1 \end{vmatrix} \text{ with:} \quad (6)$$

$$\begin{vmatrix} A = DY \cdot Z1 - Y1 \\ B = DX \cdot Z1 - X1 \\ C = A^2 \cdot Z1 - B^3 - 2 \cdot B^2 \cdot X1 \end{vmatrix}$$

$$X3 = B \cdot C \quad A = DY \cdot Z1 - Y1$$

$$Y3 = A \cdot (B^2 \cdot X1 - C) - B^3 \cdot Y1 \quad B = DX \cdot Z1 - X1$$

$$Z3 = B^3 \cdot Z1 \text{ with: } C = A^2 \cdot Z1 - B^3 - 2 \cdot B^2 \cdot X1 \quad (6)$$

This embodiment thus obtains a reduction of three multiplications of big numbers for each addition of points performed in step 2.2. Such an addition of points where one of the points is expressed in projective coordinates, the other in affine coordinates (or projective with Z=1) and the result is obtained in projective coordinates, is referred to as "combined" addition.

The algorithm A5 presented in Appendix II is derived from the algorithm A4 by applying a two-bit sliding window, i.e. by processing two bits of the scalar number k upon each iteration. The number of iterations to be performed is thus divided by two, by using a set R of three registers instead of only one register. Furthermore, the number of registers of the set of registers DP is divided by two compared to the algorithm A4, and each register DP[i] receives the multiple $[2^{2i}]\cdot P$. Each iteration of index i comprises two steps 2.1 and 2.2. Step 2.1 involves calculating a whole number u by combining two consecutive bits $k_{2i}$ and $k_{2i+1}$ of ranks 2i and 2i+1 of the scalar number k. Step 2.2 which is executed if the number u is non zero, involves adding to the point in the register R[u] the point DP[i], i.e. $[2^{2i}]\cdot P$. When all the iterations have been performed, the result of the scalar multiplication is obtained by the combination of the values of the registers $R[1][+]2\cdot R[2][+]3\cdot R[3]$.

The algorithm A6 presented in Appendix II is a generalization of the algorithm A5 to a sliding window of m values, i.e. by grouping together the processing of m bits $k_i$ of the scalar number k upon each iteration. The application of such a sliding window thus enables the number of iterations to be reduced. However this reduction is obtained to the detriment of the number of adding and doubling operations performed in step 3 which increases in an exponential manner (in $2^m$). There is therefore an optimum value of the size of the sliding window, depending on the size v of the scalar number.

It can be seen that the operation performed in step 2.2 of the algorithm A4, can be carried out in any order. Thus, the rank i of the bit $k_i$ processed upon each iteration can be chosen randomly or pseudo-randomly, provided that each bit $k_i$ of the scalar number k is processed only once.

The algorithm A4' presented in Appendix II is derived from the algorithm A4 by adding an additional step 2' of applying a random permutation a to the bits $k_i$ of the scalar number k. Step 2.2 is also modified to use the multiple $DP[\sigma(i)]$ corresponding to the bit $k_{\sigma(i)}$ processed by the current iteration. A pseudo-random permutation algorithm is described for example in the document "A New DPA Countermeasure Based on Permutation Tables", Jean-Sébastien Corn, SCN 2008, p. 278-292. SPA and DPA (Differential Power Analysis) attacks can thus be neutralized without having to add any dummy operations and thus without penalizing the computing performance. Indeed, such attacks aim to determine upon which iterations an adding operation is performed, and to deduce the value of the scalar number k, given that an adding operation is performed for each bit $k_i$ equal to 1 of the number k. If the bits $k_i$ are processed in a random order as is the case in the algorithm A4', such an attack merely enables the number of bits $k_i$ on 1 to be determined, but not their respective ranks in the number k.

In the algorithms A5 and A6, the groups of bits of the scalar number k processed upon each iteration, can also be processed in any order, for example chosen randomly. The result is that the groups of two or m bits of the number k processed upon each iteration are not necessarily consecutive. The groups of bits $k_i$ processed upon each iteration of the algorithms A5 and A6 can thus be chosen randomly or pseudo-randomly, provided that all the bits of the scalar number k are taken into account in the calculation of the scalar product. Thus, the algorithms A5', A6' presented in Appendix II are derived from the algorithms A5 and A6 by adding to each of them an additional step 2' of applying a random permutation to the bits of the scalar number k. The steps 2.1 and 2.2 are also modified to take into account the rank of each of the bits $k_i$ processed by the current iteration in the calculation of the number u and when reading the registers DP.

FIG. 1 represents in block diagram form an electronic device DV1 configured to execute a cryptographic calculation including one or more of the algorithms A3, A4, A4', A5, A5', A6, A6' applied to big numbers. The device DV1 can be an integrated circuit on a semiconductor chip arranged on a portable medium like a plastic card, the assembly forming a smart card. The device DV1 can also be any device equipped with a multi-task processor, such as a smartphone, a multimedia player, a tactile tablet or a personal computer. The device DV1 can also be a component of such a device, for example coupled to a main processor of the device.

The device DV1 comprises a processor PROC, a calculation block AB1 configured to execute an addition of points P and Q belonging to an elliptic curve, a calculation block DB1 configured to execute a doubling of a point P belonging to an elliptic curve, a memory MEM and a communication interface circuit IC. The interface circuit IC can be of the contact or contactless type, for example an RF or UHF interface circuit operating by inductive coupling or by electrical coupling. The calculation blocks AB1, DB1 can each comprise a coprocessor equipped with a programmable central unit, an entirely hardware coprocessor of state machine type. The calculation blocks AB1, DB1 may merely correspond to a function called by a main program executed in particular by the processor PROC. The two calculation blocks AB1, DB1 can also be integrated into a same component (coprocessor or state machine).

In a conventional manner per se, a variable is said to be "big" when its size (in number of bits) is greater than that of the calculation registers of the processor PROC. The latter itself performs, without using the calculation blocks AB1, DB1, operations of numbers that are smaller than or equal to the size of its calculation registers, and uses the calculation blocks AB1, DB1 to perform adding and doubling operations concerning elliptic curve points having big coordinates. For example, if the size of the calculation registers of the processor PROC is 32 bits, a big variable is a variable greater than 32 bits. In cryptography based on elliptic curves, the variables handled (coordinates of the points of elliptic curves, parameters p—modulus, b, n—number of points belonging to the elliptic curve, Gx, Gy—coordinates of the base point G) can reach several hundreds of bits (typically 160, 192, 224, 256, 320, 384, 521 bits).

The memory MEM is coupled to the processor PROC and enables the device DV1 to store a secret key k. The processor PROC receives, through the interface circuit IC, a message m to be ciphered, deciphered, or signed, or a signature to be checked, and sends back a ciphered or deciphered message, or a signature, of the $F_k(m)$ type, $F_k$ being a cryptography function based on the key k comprising a scalar multiplication calculation executed by means of one of the algorithms presented in Appendix II. During the scalar multiplication calculation, the processor PROC uses the calculation blocks AB1, DB1, by providing points P, Q to the calculation block AB1 which sends back the sum P [+] Q, and by providing a point P to the calculation block DB1 which sends back the double $[2]\cdot P$. A part of the memory MEM can also be used as buffer memory to store the content of the registers R and DP mentioned in the algorithms presented in Appendix II.

The device DV1 may also comprise calculation blocks configured to execute a modular multiplication of big numbers and a modular squaring of a big number, these calculation blocks being used by the calculation blocks AB1, DB1 to implement the equations (1) to (6).

The execution times per bit of the scalar number k and the number of large registers used (i.e. of points to be stored) for each of the algorithms previously presented are grouped together in the following table 1:

TABLE 1

| Algorithm | Execution time per bit of the scalar k in homogeneous projective coordinates | Execution time per bit of the scalar k in homogeneous projective coordinates using combined additions | Number of registers |
|---|---|---|---|
| ADD | ≈13.6 · M | ≈10.6 · M | |
| DOUBLE | ≈11 · M | ≈11 · M | |
| A1 | ≈17.8 · M | ≈16.3 · M | 1 |
| A1' | ≈17.8 · M | | 2 |
| A2 | ≈24.6 · M | ≈21.6 · M | 2 |
| A3 | ≈17.8 · M | | v + 1 |
| A4 | ≈6.8 · M | ≈5.3 · M | v + 1 |
| A5 | ≈(5.1 + 51.8/v) · M | ≈(3.98 + 51.8/v) · M | v/2 + 3 |
| A6/m = 3 | ≈(3.97 + 172/v) · M | ≈(3.09 + 172/v) · M | v/3 + 7 |
| A6/m = 4 | ≈(3.19 + 455/v) · M | ≈(2.48 + 455/v) · M | v/4 + 15 |
| A6/m = 8 | ≈(1.69 + 14,000/v) · M | ≈(1.32 + 14,000/v) · M | v/8 + 255 |

In Table 1, v represents the number of bits of the scalar number k, and M represents the computing time of a multiplication of big numbers, M also varying according to the number v. The numerical values relating to the execution time contained in Table 1 have been obtained by considering that the cost in computing time of a squaring of a big number is equal to 0.8 times that of a multiplication of big numbers, and by disregarding the execution time of the additions and subtractions of big numbers. Table 1 also mentions the execution time of the adding and doubling operations of a point. In the algorithms A5, A6, the additional term contained in the columns relating to the execution time, represents the computing time taken to execute step 3 in relation to the number of bits v. The number of adding and doubling operations performed in step 3 rapidly increases with the value of m.

It emerges from Table 1 that the algorithms A4 to A6 reach a computing time per bit of the scalar number substantially equal to or lower than half the computing time of an addition of points of an elliptic curve.

According to one embodiment, the algorithms presented in Appendix II are suited to processing scalar numbers coded not in binary but in another form, for example in NAF coding (Non-Adjacent Form). In NAF coding, each bit of a number can have three states (−1,0,1) and each bit different from 0 of the number is preceded and followed by a bit on 0; the first and last bits of the number can have any value. The result is that the average number of bits on 0 of a number (Hamming weight) goes from half in binary to one third in NAF coding, whereas the number of bits of a number in NAF coding is identical or increased by 1 compared to that of the same number coded in binary. Thus, the algorithms A4", A5", A6", presented in Appendix III are adaptations of the algorithms A4, A5, A6 to a representation of the numbers in NAF coding. In comparison with the algorithms A4, A5, A6, the algorithms A4", A5", A6" comprise an additional step 2.3 to deal with the case in which the bit $k_i$ is equal to −1. In this case, the multiple DP[i] or DP[u] is subtracted from the point R. Conventionally, the operation of subtracting points involves an addition, the sign of the second operand being changed. In the group of points of an elliptic curve on a Galois field of $F_p$ type, p being a prime number greater than 3, the change of sign of a point P(x,y) in affine coordinates involves changing the sign of its second coordinate y. In the group of points of an elliptic curve on a Galois field of $F_{2^m}$ type, the change of sign of a point P(x,y) in affine coordinates involves replacing the second coordinate with the sum x+y of the coordinates of the point.

It will be understood that the algorithms A4', A5', A6' can be adapted in a similar way to process numbers in NAF coding, to counter attacks of SPA and/or DPA type.

Given the average ratio of bits different from 0 equal to 1/3, in a number in NAF coding, the execution times per bit of the scalar number k for each of the algorithms A4", A5", A6" are contained in Table 2 below:

TABLE 2

| Algorithm | Execution time per bit of the scalar k in homogeneous projective coordinates | Execution time per bit of the scalar k in homogeneous projective coordinates using combined additions |
|---|---|---|
| A4" | ≈4.53 · M | ≈3.53 · M |
| A5" | ≈3.478 + 51.8/v) · M | ≈(2.94 + 51.8/v) · M |
| A6"/m = 3 | ≈3.19 + 172/v) · M | ≈(2.49 + 172/v) · M |
| A6"/m = 4 | ≈(2.73 + 455/v) · M | ≈(2.13 + 455/v) · M |
| A6"/m = 8 | ≈(1.63 + 14,000/v) · M | ≈(1.27 + 14,000/v) · M |

The number of large registers used by the algorithms A4", A5", A6" remains unchanged compared to those used by the algorithms A4, A5, A6.

The algorithms presented in Appendices II and III can be implemented in a public key digital signature algorithm of ECDSA type. The ECDSA algorithm involves choosing an elliptic curve E(a,b) on a Galois field $F_q$, and a base point G(Gx,Gy) of the elliptic curve chosen E(a,b). The number n is the smallest positive whole number such that [n]·G=Ø (point at infinity). The aim is then to generate a pair of public and private keys. The private key s can be chosen randomly between 1 and n−1. The public key Q is chosen equal to [s]·G. As the point G is fixed, the doubles of the point G can be calculated only once and stored in a table. The public key Q can be obtained by the algorithm A3 or by the other algorithms presented in Appendix II and III, if the table DP containing the multiples in $2^t$ of the point G has been completed.

To sign a message m, a number k between 1 and n−1 is randomly chosen. The coordinates of the point P(i,j)=[k]·G are calculated. If x=i mod n is equal to 0, it is necessary to choose another number k. The number $y=k^{-1}(H(m)+sx) \bmod n$ is then calculated, where H(m) is the result of a hashing function such as SHA-1, applied to the message m. If the number y obtained is zero, it is necessary to start the calculation again by choosing another value for the number k. The signature is made up of the pair (x, y).

To check the signature (x,y), it is first necessary to check that the point Q constituting the public key is different from Ø, that it belongs to the elliptic curve E(a,b), that [n]·Q=Ø and that x and y are indeed between 1 and n−1. Then, the coordinates of the point P(i,j) must be calculated in the following manner:

$$P(i,j)=[H(m)\cdot y^{-1} \bmod n]\cdot G+[x\cdot y^{-1} \bmod n]\cdot Q$$

and it is necessary to check that x=i mod n. The multiples in $2^i$ of the point Q can also be stored in a table if the pair of keys (s,Q) can be used several times to sign and check the signature of a message.

The algorithms presented in Appendix II and III can also be implemented in the ECIES ciphering/deciphering algorithm. A pair of private and public keys (s, Q) can be generated as in the ECDSA algorithm. To cipher a message m, a number r between 1 and n−1 is randomly chosen, and the points R=[r]·G and P(x,y)=[r]·Q are calculated, Q being the public key of the recipient of the ciphered message. The condition P≠Ø must be checked. Here again, the multiples in $2^i$ of the points G and Q can be calculated once and for all and stored in tables. A key derivation function KDF is then used to generate symmetric keys Ke, Km, such that (Ke, Km)=KDF(x,S1), S1 being a datum shared with the recipient of the ciphered message. The message m is then ciphered by a symmetric ciphering algorithm E using the key Ke. A datum d is then calculated by applying a hashing function to the key Km and to another datum S2 shared with the recipient of the message. The result c of the ciphering of the message is sent to the recipient of the ciphered message with the datum d and the public key R.

To decipher the ciphered message (c,d) the recipient of the message calculates the point P(x,y)=[s]·R (=[r]·Q). The point P obtained must be different from Ø. The same key derivation function KDF and the shared datum S1 are then used to generate the symmetric keys Ke, Km. The number d is then calculated by using the same formula applied to the key Km and to the shared datum S2. If the number d obtained is identical to the number d received, the message can be deciphered by applying to the ciphered datum c received, the symmetric deciphering function corresponding to the ciphering function used, using the key Ke.

It will be understood by those skilled in the art that the present invention is susceptible of various alternative embodiments and various applications. In particular, the invention is not limited to the applications presented, but applies to any other elliptic curve cryptography application in which the doubles of a point are reused several times.

The present invention is not limited either to the projective coordinates presented, but applies to any other type of coordinates, the adaptation of the algorithms presented to these other types of coordinates being within the understanding of those skilled in the art.

The present invention is not limited either to storing all the multiples in $2^i$ or $2^{m-i}$ of the point P being the subject of a scalar multiplication, up to v or $$\left\lceil \frac{v}{m} \right\rceil,$$

i.e. the smallest whole number greater than v/m. Indeed, it can be desirable to limit the memory space occupied by the registers DP. For this purpose, the missing multiples can be calculated upon the iterative calculation of the result of the multiplication, only if necessary. Thus, in the algorithms A4, A4' and A4'', only the multiples in $2^{2i}$ or $2^{2i+1}$ may be stored, it being possible to calculate the missing multiples according to the needs of the scalar multiplication calculation, merely by performing a doubling operation to multiply the immediately lower multiple DP[i] by 2. This arrangement can easily be extrapolated to the algorithms A5 and A6 and their derived algorithms. It may also be considered to store only the first multiples in $2^i$ or $2^{m-i}$ of the point P, the other multiples being calculated upon each iteration as in the algorithm A3.

APPENDIX I

Being an Integral Part of the Description

---

Algorithm A1 - Multiplication by a Double
& Add scalar, from left to right

Input: a point P belonging to the elliptic curve E on the Galois field $F_q$
a whole scalar k of v bits such that k = $(k_{v-1} k_{v-2} .... k_0)_2$
Requires: a register R of the size of the point P
Output: [k]·P
Step 1: R = Ø
Step 2: for s ranging from v−1 to 0, do:
    Step 2.1: R = [2]·R     (DOUBLE)
    Step 2.2: if $k_s$ = 1 then R = R [+] P     (ADD)
Step 3: Send back R

---

Algorithm A1' - Multiplication by
a Double & Add scalar, from right to left

Input: a point P belonging to the elliptic curve E on the Galois field $F_q$
a whole scalar k of v bits such that k = $(k_{v-1} k_{v-2} .... k_0)_2$
Requires: two registers $R_0$, $R_1$ of the size of the point P
Output: [k]·P
Step 1: $R_0$ = Ø; $R_1$ = P
Step 2: for s ranging from 0 to v−1, do:
    Step 2.1: if $k_s$ = 1 then $R_0$ = $R_0$ [+] $R_1$     (ADD)
    Step 2.2: $R_1$ = [2]·$R_1$     (DOUBLE)
Step 3: Send back $R_0$ "P[+]Q" represents the addition of two points P and Q of an elliptic curve
"Ø" represents the neutral element of the $F_q$ field (such that P[+]Ø = Ø[+]P = P)

---

Algorithm A2 - "Montgomery Ladder" (from left to right)

Input: a point P belonging to the elliptic curve E on the Galois field $F_q$
a whole scalar k of v bits such that k = $(k_{v-1} k_{v-2} .... k_0)_2$
Requires: two registers $R_0$, $R_1$ of the size of the point P
Output: [k]·P
Step 1: $R_0$ = Ø; $R_1$ = P
Step 2: for s ranging from v−1 to 0, do:
    Step 2.1: b = $k_s$
    Step 2.2: $R_{1-b}$ = $R_{1-b}$ [+] $R_b$     (ADD)
    Step 2.3: $R_b$ = [2]·$R_b$     (DOUBLE)
Step 3: Send back $R_0$

---

APPENDIX II

Being an Integral Part of the Description

---

Algorithm A3 - Multiplication by a "Double & Add" scalar

Input: a point P belonging to the elliptic curve E on the Galois field $F_q$
a whole scalar k of v bits such that k = $(k_{v-1} k_{v-2} .... k_0)_2$
Requires: a register R of the size of the point P
a set of v+1 registers DP of the size of the point P
Output: [k]·P
Step 1: R = Ø; DP[0] = P
Step 2: for i ranging from 0 to v−1, do:
    Step 2.1: DP[i+1] = [2]·DP[i]     (DOUBLE)
    Step 2.2: if $k_i$ = 1 then R = R [+] DP[i]     (ADD)
Step 3: Send back R

| Algorithm A4 - Multiplication by a Doubles Stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a register R of the size of the point P<br>   a set of v registers DP of the size of the point P such that<br>    DP[i]=$[2^i] \cdot P$, with $0 \leq i < v$<br>Output: $[k] \cdot P$<br>Step 1: R = ∅<br>Step 2: for i ranging from 0 to v−1, do:<br>  Step 2.2: if $k_i$ = 1 then R = R [+] DP[i]     (ADD)<br>Step 3: Send back R |

| Algorithm A4' - Secured multiplication by a Doubles Stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a register R of the size of the point P<br>   a set of v registers DP of the size of the point P such that<br>    DP[i]=$[2^i] \cdot P$, with $0 \leq i < v$<br>Output: $[k] \cdot P$<br>Step 1: R = ∅<br>Step 2': Generate a random permutation σ in $\{0, \ldots, v-1\}$<br>Step 2: for i ranging from 0 to v−1, do:<br>  Step 2.2: if $k_{\sigma(i)}$ = 1 then R = R [+] DP[σ(i)]   (ADD)<br>Step 3: Send back R |

| Algorithm A5-Multiplication by a Doubles Stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a set R of three registers of the size of the point P<br><br>   a set of $\lceil \frac{v}{2} \rceil$ registers DP of the size of the point P<br><br>   such that DP[i] = $[2^{2i}] \cdot P$, with $0 \leq i < \lceil \frac{v}{2} \rceil$<br><br>Output: $[k] \cdot P$<br>Step 1: R[1] = ∅; R[2] = ∅; R[3] = ∅<br><br>Step 2: for i ranging from 0 to $\lceil \frac{v}{2} \rceil - 1$, do:<br><br>  Step 2.1: u = $k_{2i} + 2k_{2i+1}$<br>  Step 2.2: if u ≥ 1 then R[u] = R[u][+] DP[i] (ADD)<br>Step 3: R[1] = R[1][+] R[3] [+] [2] · (R[2] [+] R[3]) (ADD)<br>Step 4: Send back R[1]<br>⌈X⌉ representing the smallest whole number greater than or equal to x |

| Algorithm A5'-Secured multiplication by a Doubles Stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a set R of three registers of the size of the point P<br><br>   a set of $\lceil \frac{v}{2} \rceil$ registers DP of the size of the point P<br><br>   such that DP[i] = $[2^{2i}] \cdot P$, with $0 \leq i < \lceil \frac{v}{2} \rceil$<br><br>Output: $[k] \cdot P$<br>Step 1: R[1] = ∅; R[2] = ∅; R[3] = ∅<br><br>Step 2': Generate a random permutation σ with $\lceil \frac{v}{2} \rceil$<br><br>elements in $\{0, \ldots, \lceil \frac{v}{2} \rceil - 1\}$<br><br>Step 2: for i ranging from 0 to $\lceil \frac{v}{2} \rceil - 1$, do:<br><br>  Step 2.1: u = $k_{2\sigma(i)} + 2k_{2\sigma(i)+1}$<br>  Step 2.2: if ≥ 1 then R[u] = R[u] [+] DP[σ(i)] (ADD)<br>Step 3: R[1] = R[1] [+] R[3] [+] [2] · (R[2] [+] R[3]) (ADD)<br>Step 4: Send back R[1] |

| Algorithm A6-Multiplication by a Doubles stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a set R of $2^m - 1$ registers of the size of the point P (m > 2)<br><br>   a set of $\lceil \frac{v}{m} \rceil$ registers DP of the size of the point P<br><br>   such that DP[i] = $[2^{m \cdot i}] \cdot P$, with $0 \leq i < \lceil \frac{v}{m} \rceil$<br><br>Output: $[k] \cdot P$<br>Step 1: for j ranging from 1 to $2^m - 1$, do R[j] = ∅<br><br>Step 2: for i ranging from 0 to $\lceil \frac{v}{m} \rceil - 1$, do:<br><br>  Step 2.1: u = $\sum_{j=0}^{m-1} 2^j \cdot k_{m \cdot i + j}$ (with $k_i$ = 0 if i > v − 1)<br><br>  Step 2.2: if u ≥ 1 then R[u] = R[u] [+] DP[i] (ADD)<br><br>Step 3: R[1] = $\left[ \sum_{j=1}^{2^m-1} [j] \cdot R[j] \right]$ (ADD)<br><br>Step 4: Send back R[1]<br>[Σ] represents the adding operator for adding points in the group of points of the elliptic curve, with coordinates in the field $F_q$. |

| Algorithm A6'-Multiplication by a Doubles stored & Add Only scalar |
|---|
| Input: a point P belonging to the elliptic curve E on the Galois field $F_q$<br>   a whole scalar k of v bits such that k = $(k_{v-1} k_{v-2} \ldots k_0)_2$<br>Requires: a set R of $2^m - 1$ registers of the size of the point P (m > 2)<br><br>   a set of $\lceil \frac{v}{m} \rceil$ registers DP of the size of the point P<br><br>   such that DP[i] = $[2^{m \cdot i}] \cdot P$, with $0 \leq i < \lceil \frac{v}{m} \rceil$<br><br>Output: $[k] \cdot P$<br>Step 1: for j ranging from 1 to $2^m - 1$, do R[j] = ∅<br><br>Step 2': Generate a random permutation σ with $\lceil \frac{v}{2} \rceil$<br><br>elements in $\{0, \ldots, \lceil \frac{v}{m} \rceil - 1\}$<br><br>Step 2: for i ranging from 0 to $\lceil \frac{v}{m} \rceil - 1$, do: |

| Algorithm A6'-Multiplication by a Doubles stored & Add Only scalar |
|---|
| Step 2.1: $u = \sum_{j=0}^{m-1} 2^j k_{m\sigma(i)+j}$ (with $k_i = 0$ if $i > v - 1$) |
| Step 2.2: if $u \geq 1$ then $R[u] = R[u]\ [+]\ DP[\sigma(i)]$ (ADD) |
| Step 3: $R[1] = \left[\sum_{j=1}^{2^m-1} [j] \cdot R[j]\right]$ (ADD) |
| Step 4: Send back $R[1]$ |

APPENDIX III

Being an Integral Part of the Description

| Algorithm A4" - Multiplication by a Doubles Stored & Add Only scalar |
|---|
| Input: a point P belonging to the elliptic curve E on the Galois field $F_q$<br>a whole scalar k of v bits such that $k = (k_{v-1}\ k_{v-2}....\ k_0)_2$, NAF coded |
| Requires: a register R of the size of the point P<br>a set of v registers DP of the size of the point P such that $DP[i]=[2^i] \cdot P$, with $0 \leq i < v$ |
| Output: $[k] \cdot P$ |
| Step 1: $R = \emptyset$ |
| Step 2: for i ranging from 0 to v–1, do: |
|     Step 2.2: if $k_i = 1$ then $R = R\ [+]\ DP[i]$     (ADD) |
|     Step 2.3: if $k_i = -1$ then $R = R\ [-]\ DP[i]$     (ADD) |
| Step 3: Send back R |

| Algorithm A5"-Multiplication by a Doubles Stored & Add Only scalar |
|---|
| Input: a point P belonging to the elliptic curve E on the Galois field $F_q$<br>a whole scalar k of v bits such that $k = (k_{v-1}\ k_{v-2}\ ...\ k_0)_2$, NAF coded |
| Requires: a set R of three registers of the size of the point P |
| a set of $\lceil \frac{v}{2} \rceil$ registers DP of the size of the point P |
| such that $DP[i] = [2^{2i}] \cdot P$, with $0 \leq i < \lceil \frac{v}{2} \rceil$ |
| Output: $[k] \cdot P$ |
| Step 1: $R[1] = \emptyset;\ R[2] = \emptyset;\ R[3] = \emptyset$ |
| Step 2: for i ranging from 0 to $\lceil \frac{v}{2} \rceil - 1$, do: |
|     Step 2.1: $u = k_{2i} + 2k_{2i+1}$ |
|     Step 2.2: if $u \geq 1$ then $R[u] = R[u]\ [+]\ DP[i]$ (ADD) |
|     Step 2.3: if $u \leq -1$ then $R[u] = R[-u]\ [-]\ DP[i]$ (ADD) |
| Step 3: $R[1] = R[1]\ [+]\ R[3]\ [+]\ [2] \cdot (R[2]\ [+]\ R[3])$ (ADD) |
| Step 4: Send back $R[1]$ |

| Algorithm A6"-Multiplication by a Doubles stored & Add Only scalar |
|---|
| Input: a point P belonging to the elliptic curve E on the Galois field $F_q$<br>a whole scalar k of v bits such that $k = (k_{v-1}\ k_{v-2},\ ...\ k_0)_2$, NAF coded |
| Requires: a set R of $2^m - 1$ registers of the size of the point P (m > 2) |
| a set of $\lceil \frac{v}{m} \rceil$ registers DP of the size of the point P |

| Algorithm A6"-Multiplication by a Doubles stored & Add Only scalar |
|---|
| such that $DP[i] = [2^{m \cdot i}] \cdot P$, with $0 \leq i < \lceil \frac{v}{2} \rceil$ |
| Output: $[k] \cdot P$ |
| Step 1: for j ranging from 1 to $2^m - 1$, do $R[j] = \emptyset$ |
| Step 2: for i ranging from 0 to $\lceil \frac{v}{m} \rceil - 1$, do: |
|     Step 2.1: $u = \sum_{j=0}^{m-1} 2^j \cdot k_{m \cdot i+j}$ (with $k_i = 0$ if $i > v - 1$) |
|     Step 2.2: if $u \geq 1$ then $R[u] = R[u]\ [+]\ DP[i]$ (ADD) |
|     Step 2.3: if $u \leq -1$ then $R[u] = R[-u]\ [-]\ DP[i]$ (ADD) |
| Step 3: $R[1] = \left[\sum_{j=1}^{2^m-1} [j] \cdot R[j]\right]$ (ADD) |
| Step 4: Send back $R[1]$ |

The invention claimed is:

1. A cryptographic data processing method comprising:
receiving, by a processor in an electronic device, a point of an elliptic curve in a Galois field and a first integer number, the first integer number being a private encryption key; and
performing, by the processor, a cryptographic operation including a scalar multiplication calculation of the point by the first integer number, the point being defined by coordinates, the coordinates of the point and the first integer number having a size greater than a size of words that can be processed, by the processor, without being divided into smaller words,
the scalar multiplication calculation of the point by the first integer number including:
storing a set of multiple points each resulting from a scalar product of the point by 2 raised to a power belonging to a set of integer numbers,
initializing a resulting point belonging to the elliptic curve,
performing several iterations to take into account each of the bits of the first integer number only once, each iteration including:
a calculation of a bit combination of several bits of the first integer number, and
when the bit combination is non-zero, modifying the resulting point by performing an addition between a prior value of the resulting point and one of the stored multiple points corresponding to ranks of bits in the bit combination, and
providing, by the processor, the resulting point as result of the scalar multiplication calculation of the point by the integer first number, the resulting point including a public encryption key corresponding with the private encryption key.

2. The method according to claim 1, wherein the bits of the first integer number are taken into account in a random or pseudo-random order when calculating the resulting point.

3. The method according to claim 1, wherein additions between prior values of the resulting point and the stored multiple points are performed in affine coordinates.

4. The method according to claim 1, wherein the additions between prior values of the resulting point and the stored multiple points are performed in projective coordinates.

5. The method according to claim 4, wherein the scalar products of the point are stored in affine coordinates, which are transformed into projective coordinates by adding, to the affine coordinates, a third coordinate having a value set to 1.

6. The method according to claim 1, wherein the first integer number and the coordinates of the point are non-adjacent-form (NAF) coded, the method further comprising, for each of the bit combinations of the first integer number less than or equal to −1, performing an adding calculation between the resulting point and an opposite of one of the stored multiples corresponding to a rank in the first number of the bit combination.

7. The method according to claim 1, further comprising:
randomly choosing the first integer number as the private encryption key; and
choosing the resulting point of the scalar multiplication of the point by the first integer number or one of the coordinates of the resulting point as the public encryption key corresponding to the private encryption key.

8. The method according to claim 1, further comprising signing a message, the signing including:
randomly choosing a second integer number;
applying a hashing function to the message to be signed; and
calculating a signature of the message from the following equations:

$x = i \bmod n$ $y = k^{-1}(H(m) + s \cdot x) \bmod n,$ in which x and y represent the signature of the message m, i being the public encryption key, k being the second integer number, H(m) being the hashing function applied to the message m, s being the private encryption key, and n being a smallest positive integer number such that the scalar product of n by the point is equal to a point at infinity of the elliptic curve.

9. An electronic device comprising a processor configured to:
receive a point of an elliptic curve in a Galois field and a first integer number, the first integer number being a private encryption key; and
perform a cryptographic operation including a scalar multiplication calculation of the point by the first integer number, the point being defined by coordinates, the coordinates of the point and the first integer number having a size greater than a size of words that can be processed, by the processor, without being divided into smaller words,
the scalar multiplication calculation of the point by the first integer number including:
storing a set of multiple points each resulting from a scalar product of the point by 2 raised to a power belonging to a set of integer numbers;
initializing a resulting point belonging to the elliptic curve;
performing several iterations to take into account each of the bits of the first integer number only once, each iteration including:
a calculation of a bit combination of several bits of the first integer number; and
when the bit combination is non-zero, modifying the resulting point by performing an addition between a prior value of the resulting point and one of the stored multiple points corresponding to ranks of bits in the bit combination; and
providing, by the processor, the resulting point as result of the scalar multiplication calculation of the point by the first integer number, the resulting point including a public encryption key corresponding with the private encryption key.

10. The device according to claim 9, wherein the device is portable and autonomous, or is of a smart card type.

11. The device according to claim 9, wherein the bits of the first integer number are taken into account in a random or pseudo-random order when calculating the resulting point.

12. The device according to claim 9, wherein additions between prior values of the resulting point and the stored multiple points are performed in affine coordinates.

13. The device according to claim 9, wherein the additions between prior values of the resulting point and the stored multiple points are performed in projective coordinates.

14. The device according to claim 13, wherein the scalar products of the point are stored in affine coordinates, which are transformed into projective coordinates by adding, to the affine coordinates, a third coordinate having a value set to 1.

15. The device according to claim 9, wherein the first integer number and the coordinates of the point are non-adjacent-form (NAF) coded, the processor being further configured to, for each of the bit combinations of the first integer number, less than or equal to −1, performing an adding calculation between the resulting point and an opposite of one of the stored multiples corresponding to a rank in the first integer number of the bit combination.

16. The device according to claim 9, wherein the processor is further configured to:
randomly choose the first integer number as the private encryption key, and
choose the resulting point of the scalar multiplication of the point by the first integer number or one of the coordinates of the resulting point as a public encryption key corresponding to the private encryption key.

17. The device according to claim 9, wherein the processor is configured to sign a message, by:
randomly choosing a second integer number,
applying a hashing function to the message to be signed, and
calculating a signature of the message from the following equations:

$x = i \bmod n$ $y = k^{-1}(H(m) + s \cdot x) \bmod n,$ in which x and y represent the signature of the message m, i being the public encryption key, k being the second integer number, H(m) being the hashing function applied to the message m, s being the private encryption key, and n being a smallest positive integer number such that the scalar product of n by the point is equal to a point at infinity of the elliptic curve.

* * * * *